Feb. 10, 1970 P. L. LAMELOT 3,494,576
SELF-CONTAINED AND AUTOMATIC GUIDANCE SYSTEM FOR DIRECTING A
MISSILE TOWARDS A RADIATION-EMITTING TARGET
Filed Oct. 17, 1967 2 Sheets-Sheet 1
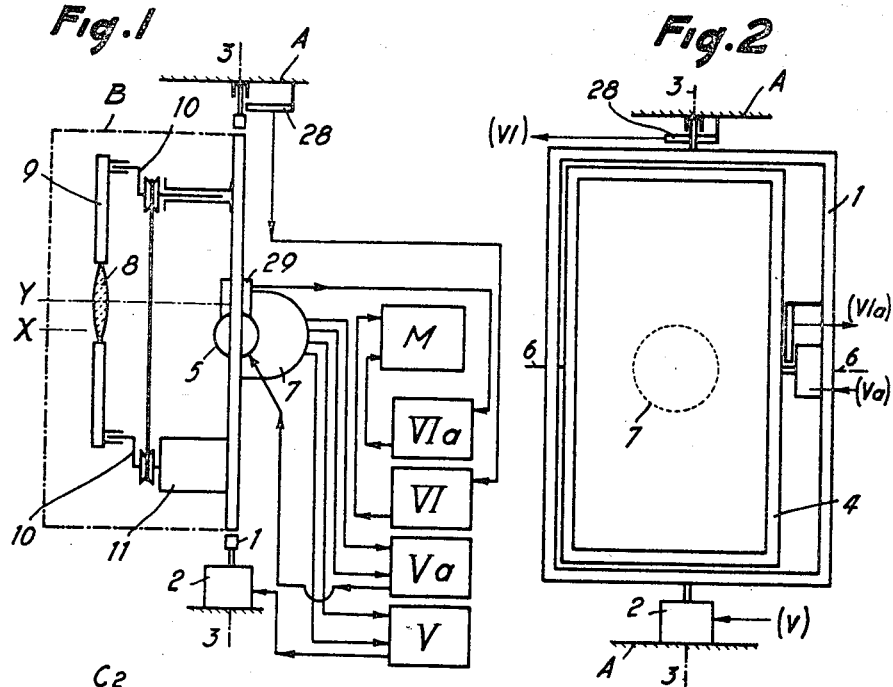
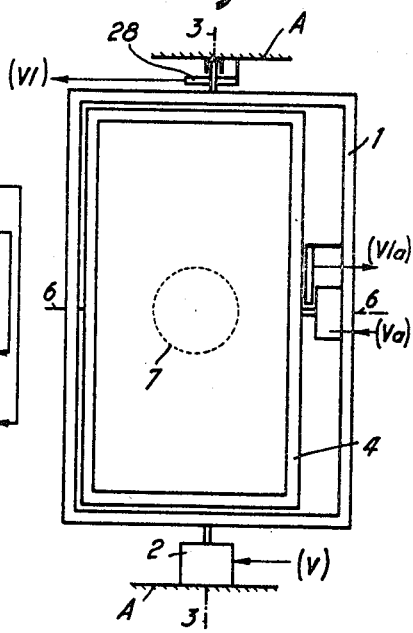
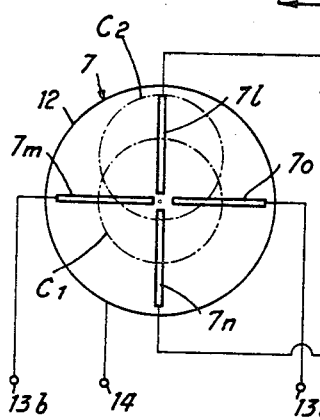
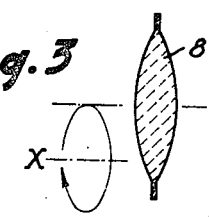
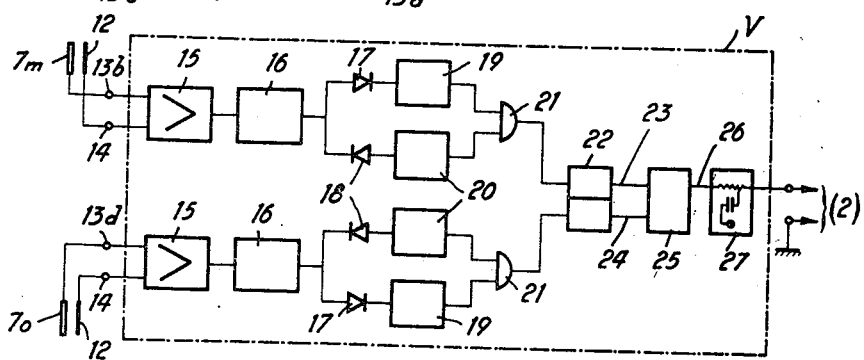
Inventor:
Pierre Louis Lamelot
By
ATTORNEY

United States Patent Office 3,494,576
Patented Feb. 10, 1970

3,494,576
SELF-CONTAINED AND AUTOMATIC GUIDANCE SYSTEM FOR DIRECTING A MISSILE TOWARDS A RADIATION-EMITTING TARGET
Pierre Louis Lamelot, Ville-d'Avray, France, assignor to Societe Anonyme de Telecommunications, Paris, France, a French company
Filed Oct. 17, 1967, Ser. No. 676,680
Claims priority, application France, Mar. 6, 1967, 97,627
Int. Cl. F42b *19/00;* F41g *7/14*
U.S. Cl. 244—3.16
4 Claims

ABSTRACT OF THE DISCLOSURE

An automatic guidance system for a missile having flight controls and intended to be guided towards a target having a radiation source, comprising a seeker head responsive, along a searching axis, to said radiations and to the direction thereof and orientable with respect to the missile, driving units for orientating the head searching axis in the direction of the radiation emitting target, detecting and control means for detecting the position of the orientable seeker head with respect to the missile and for actuating the fight controls as a function of the detected head position, in order to bring and maintain the missile path towards the target and the said searching axis in coincidence to each other.

This invention is directed to a self-contained and automatic guidance system which is intended to be incorporated in a missile which is capable of guiding itself automatically and without any outside influence towards a target which emits radiation (for example infrared radiation which extends over the range of wavelengths of 4 to 5 microns).

The missile guidance system according to the invention is more especially (although not exclusively) intended to be mounted in a missile which is to be launched in three stages, viz:

A pre-positioning stage during which the missile which is attached to the carrier is brought into a position in which it can be aimed at the target;

A "target-capturing" stage (in which the target is located by the missile guidance system at an effective range from the target), this stage being followed by launching of the missile;

And finally, the stage of automatic flight guidance of the missile.

The aim of the invention is to produce a self-contained and automatic guidance system of the type referred-to above which is both simple to construct, highly sensitive and highly reliable, thereby improving the performance of the missile (precision and flight range) and facilitating its operation.

In accordance with the invention, the results mentioned in the foregoing are obtained by making use of an optical-electronic direction-finding unit mounted in a head or support which is housed in the missile and orientable in all directions with respect to the missile body while ensuring that the line of sight, or searching axis, on which the above-mentioned unit is located coincides at all times (by virtue of the orientability of the head) with the missile-target direction and by utilizing the knowledge of the orientation of the head referred-to with respect to a reference axis associated with the missile (for example the longitudinal axis of the missile body) for the purpose of operating the flight controls of the missile and either holding this latter on the target approach path or returning the missile to this path in the event of any deviation therefrom.

To this end, the guidance system according to the invention and which comprises a seeker head having a support which is mounted as a cardan-type assembly within the missile body and adapted to carry a lens system for the purpose of producing an image of the radiation-emitting target, a radiation detector placed in the image plane of the lens system and responsive to the position of said image, and means for causing said image to perform a circular movement on the detector, driving units or motor means for controlling the pivotal motion of the seeker head about each of the two cardan axes, an electronic assembly connected to the radiation detector for the purpose of receiving the signals and for generating command signals and transmitting said signals to the aforesaid motor means in order to maintain the sighting line of the lens system and the missile-target direction in superimposed relation and detecting and control means responsive to the orientation of the head and designed to actuate the flight-control mechanisms of the missile is characterized by the following features:

The radiation detector comprises, disposed in a same plane at right angles to the optical axis of the lens system, four sensitive thin thread-like rectilinear elements set at an angular distance of 90° with respect to each other so as to form four arms of a cross, each element being intended to constitute the anode of a separate photoelectric cell, the cathode of which is common to the four cells, whereas the lens system is actuated by a constant-speed motor so as to perform, in a plane, parallel to the image plane a circular movement of translation about an axis to which the optical axis of the lens system is parallel and which intersects the sensitive elements of the radiation detector at the point at which they cross each other;

The motor means which control the orientation of the support head consist of two electric motors which drive respectively a first pivotal support with respect to the missile body and a second support which is adapted to pivot with respect to the first support about an axis located at right angles to the pivotal axis of said first support and which is adapted to carry both the radiation detector and the lens system together with the means whereby the image projected onto the radiation detector is caused to describe a circular orbit, each of said motors being preferably a direct-current motor supplied with direct-current voltages as a function of the instantaneous deviation of the center of the orbit with respect to the crossing-point of the filiform sensitive rectilinear elements of the detector;

The electronic assembly to which the signals of the radiation detector are applied and which delivers the supply voltages to the motors for controlling the orientation of the support head comprises four identical electronic chains grouped in pairs and adapted to process the useful signals generated by the radiation from the target and to eliminate disturbances caused by any spurious signal which may be produced by a radiation source and which spreads over a useful signal the outputs of the chains of each pair of electronic chains whose inputs are coupled to two diametrically opposite anodes of the radiation detector being connected to a power chain which delivers the supply voltage to one of the support-head orientation motors;

Each electronic chain for processing a signal comprises in succession and in the downstream direction a threshold device for producing square-wave signals, two monostable multivibrators mounted in parallel and preceded by reversed diodes so as to change position in one case for the leading edge of a signal and in the other case for the trailing edge of said signal, and an AND gate which is common to both multivibrators and which does not transmit a signal unless its duration is shorter than the period of operation of the chain;

Each power chain whose input is connected to the outputs of the two AND gates of each pair of electronic chains comprises in succession and in the downstream direction a bistable multivibrator, the two inputs of which are connected respectively to the AND gates aforesaid and a differential amplifier, the two inputs of which are connected to the two outputs of the multivibrator and the single output of which is connected to the corresponding orientation control motor by means of a filter for removing alternating-current components of the amplified signal;

The control means which are intended to operate the flight-control mechanisms of the missle comprise angle detectors (resolvers, inductive potentiometers, synchros and so forth) which are designed to record the angular position of the support head about two axes of the cardan-joint assembly with respect to the reference axis and to transform this angular position into signals representing navigational information, said angle detectors being connected to the input of electronic computer means in which are produced, as a function of said angular position, command signals which are transmitted to the flight-control mechanisms.

Further properties and advantages of the invention will become apparent from the following description which relates to one example of construction of the novel guidance system, said example of construction being illustrated in the accompanying drawings, in which:

FIG. 1 is, on the one hand, a part-sectional profile view of the complete orientable seeker head which is mounted on board the missile to be guided, and on the other hand, a block diagram of the electronic assembly of the guidance system, said assembly being associated with said head;

FIG. 2 is a front view of the orientable support of the seeker head;

FIG. 3 is an elevational view of the operative face of the radiation detector which is mounted on the orientable support of the seeker head;

FIG. 4 is a profile view of the above-mentioned detector together with the optical signaling means;

FIG. 5 is a schematic diagram or block diagram of one-half (as designated by the symbol V in FIG. 1) of the electronic means which are associated with the radiation detector and which are intended to produce commands for the motor means which effect the orientation of one of the orientable support elements of the seeker head;

Figure 6:
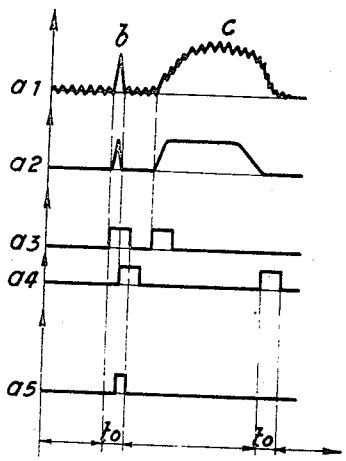
FIG. 6 is a diagram showing the successive transformations incurred in one of the chains of FIG. 5 by a signal delivered by an individual cell of the radiation detector.

In FIGS. 1 and 2, the reference A designates the missile structure (or body) which is considered as a stationary element and within which is mounted the novel automatic guidance system comprising an orientable head B, the reference axis of the system being advantageously parallel, in the present case, to the longitudinal axis of the missile.

The head B is mounted on support means which can be oriented on the principle of a cardan-type assembly or universal joint about two orthogonal axes. Said support means comprise a support member 1 which is assumed to be flat for the sake of greater clarity and which, by virtue of a motor 2, can be caused to pivot about an axis 3 on each side of a reference position which can be the position shown in the figure and in which a line at right angles to the axis 3 in the plane of the support 1 makes an angle of 90° with the reference axis.

The support member 1 carries another support member 4 which is also assumed to be flat and which, by virtue of a motor 5 mounted on the support 1, can be caused to pivot about an axis 6 located at right angles to the axis 3 on each side of a reference position which can be the position shown in the figure and in which a line at right angles to the axis 6 in the plane of the support 4 makes an angle of 90° with the reference axis.

From the foregoing definition and for the sake of clarity of the description which now follows, it will be assumed that, when the two support members 1 and 4 are located in their reference positions, the reference axis is perpendicular to the plane of the member 4 which carries the radiation detector 7 and that the plane or operative face of said detector which contains the sensitive elements is in that case also perpendicular to said axis.

Inside the head B, there is located a lens 8, the optical axis of which is given the reference Y. Said lens is carried by a mounting 9 suported by the crank-pins of two cranks 10 which rotate in synchronism and are operated from a constant-speed motor 11 in such a manner that, on the one hand, the axis Y rotates about an axis X located at right angles to the plane of the support 4 while remaining parallel to itself and, on the other hand, that the image plane of the aforesaid lens should coincide with the plane of the sensitive elements of the radiation detector 7.

The detector 7 comprises (see FIG. 3) a common cathode 12 (represented by a circle) and, in the image plane of the lens 8, the anodes 7l, 7m, 7n, and 7o of four separate filiform cells disposed in a cross at 90° with respect to each other about the axis of rotation of the lens 8, the terminals of said anodes being designated respectively by the references 13a, 13b and 13c, 13d whilst the terminal of the common cathode is designated by the numeral 14.

In FIG. 3, there have been shown two circles C1 and C2 each representing the orbit described by the target image as a result of the motion of the lens 8, the radius of each of said circles being equal to the distance between the axes X and Y.

At each moment, the missile-target direction is a straight line passing through the center of the circle described by the target image and by the optical center of the lens 8, this direction being defined by the coordinates of the center of the circle with respect to two orthogonal axes which coincide with the directions of the filiform anodes 7l–7m and 7n–7o.

As will be explained below in detail, the orientation of the head B is controlled in such a manner that the "sighting" line of the head B, that is to say the axis X about which said lens rotates, constantly tends to be restored to the missile-target direction by virtue of the orientation motors 2 and 5. Direct-current control voltages are supplied to said motors and are a function of, or proportional to, the coordinates of the center of the circle described by the target image, the direction of these voltages being naturally such that said coordinates tend to become zero (case which corresponds to the circle C1).

That portion of the electronic device V which makes it possible to obtain these results in the case of the motor 2 is shown in FIG. 5 in the form of a schematic diagram. Consideration will be given in this example to the case in which the sighting line of the head B has deviated from the missile-target direction in such a manner that the circle described by the target image is the circle C2 of FIG. 3; said circle must therefore be re-centered in order to re-occupy the position of the circle C1 in which the missile is directed towards the target.

The electronic device V of FIG. 5 therefore corresponds to the anodes $7m$–$7o$ of the detector 7 (the device V' which corresponds to the anodes $7l$ and $7n$ in order to operate the motor 5 being identical).

Each of the two anodes $7m$ and $7o$ is connected to the input of an electronic chain comprising an amplifier 15 which is followed first by a threshold device 16 then by two parallel-connected diodes 17, 18 which are mounted in opposition and followed by two monostable multivibrators 19 and 20, the outputs of which are connected to the inputs of an AND gate 21.

The outputs of the two AND gates 21 are connected to the two inputs of a bistable multivibrator 22, the two outputs 23 and 24 of which terminate in a differential amplifier 25, the output 26 of which is coupled to a filter 27, said filter being connected to the motor 2.

The two electronic chains which terminate at the motor 2 receive the signals produced as a result of the transition of the image which describes the circle C2, said signals being collected at the terminals $13b$–14 and $13d$–14.

In FIG. 6, the amplitude of each of these signals is represented at $a1$ as a function of time. Each signal is composed of a short pulse $b$ and of a longer pulse $c$, the first pulse being produced by the transition of the target image in front of the anode $7m$, for example; this is the useful pulse. The second pulse $c$ or so-called "spurious pulse" corresponds to the transition in front of this same anode of a larger image or "spurious image" which can arise from the presence of a light cloud within the scanning field of the seeker head. Moreover, small erratic signals are superimposed on the pulses referred-to above.

The threshold device 16 transforms the useful and spurious pulses of the signal into pulses which are freed from erratic signals and the amplitude of which is represented at $a2$.

The signal $a3$ which is collected (as shown in FIG. 6) at the output of the assembly 17–19 consists of two pulses having the same duration ($t_0$) which each start at the moment when the leading edges of the two pulses of the signal $a2$ appear.

At the output of the assembly 19–20, there is collected the signal $a4$ which is formed by two pulses having the same duration ($t_0$) which each start at the moment when the trailing edges of the two pulses of the signal $a2$ appear.

The AND gate 21 produces at its output the signal $a5$ which can obviously not exist unless the initial pulse supplied by the individual anode of the detector has a width equal to or smaller than ($t_0$.)

There thus takes place effective filtration and effective separation between the useful signal generated by the target and the spurious signals produced by extensive radiations sources.

The useful signal which is collected at the output of the AND gate 21 occupies in time the position of the useful pulse $b$.

Figure 7A:
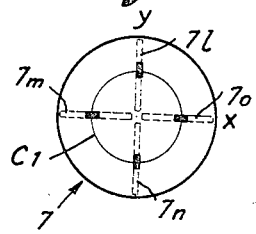
FIGS. 7a, 7b and 7c are front views of the radiation detector in three different relative positions of the orbit which is described by the target image which is projected onto the operative face of the detector.
Figure 7B:
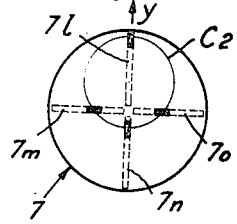
Figure 7C:
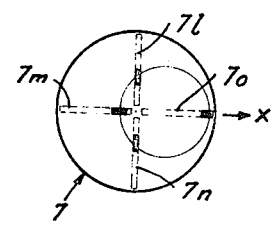
Figure 7:
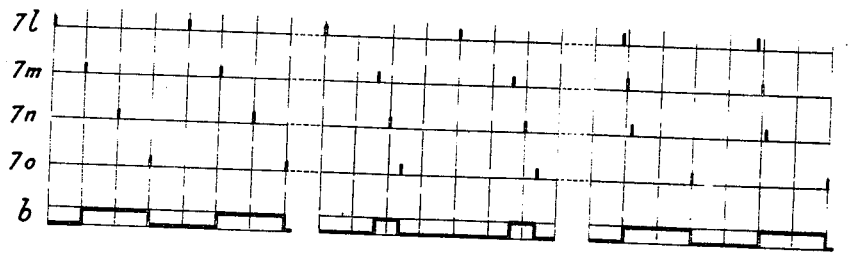
FIG. 7 is a diagram of the moments of appearance of the signals in the three cases of FIGS. 7a, 7b, 7c; and finally.

The manner in which the moment of appearance of the useful pulse $b$ varies in time in respect of each anode $7l$, $7m$, $7n$ and $7o$ (limited to their useful zone) is shown in FIG. 7 in respect of two complete revolutions of the target image and in respect of three cases of target image orbit (FIGS. $7a$, $7b$, $7c$) on the front face of the detector, the time origin being arbitrary whilst the angular velocity of the image is constant.

In the case of FIG. $7a$, the orbit is centered and the pulses appear in a uniform manner (see the left hand portion of FIG. 7).

In the case of FIG. $7b$, the orbit is displaced off-center along the $y$-axis. The signal collected at the output of the AND gates 21 supply the two inputs of the bistable multivibrator 22 which trips as soon as it receives a pulse either at one or the other of the two inputs.

At the output 23, there is collected a signal which is dependent on the respective signals of the anodes $7m$ and $7o$.

In the case of FIG. $7a$, there is collected at 23 a signal which is formed by a sequence of pulses having a cyclic ratio of 1:1 (left hand portion of FIG. 7).

In the case of FIG. $7b$, this signal varies in the manner which is shown in the central portion of FIG. 7 but does not exhibit any variation in the case of FIG. $7c$ (right hand portion of FIG. 7).

In the case in which the target image orbit appears in the form of a circle which is displaced off-center in an indeterminate manner, it is possible, broadly speaking, to define the signal as being a pulse having a recurrence frequency which is dependent on the constant speed of circular displacement of the lens 8, the mean position of which (on the axis X) is stationary for reasons of symmetry. The pulse referred-to has a duration which is variable and a function of one of the coordinates ($-y-$ in the case contemplated in FIG. $7b$ and $-x-$ in the case of FIG. $7c$) of the deviation of the position of the center of the circular orbit of the target image with respect to a reference position of said center in which said center coincides with the point of intersection of the coordinates.

This function (sine function) is not strictly linear but can practically be considered as such as long as the displacement of the center of the orbit does not exceed a relatively large fraction of the radius of the circle described by the lens 8.

Figure 8:
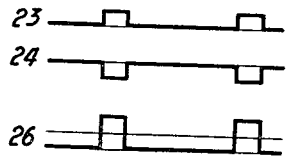
FIG. 8 is a diagram showing the variation in time of a signal which is collected at the end of the chain of the electronic device.

In the case of FIG. $7b$ (displacement off-center of the $y$-axis), there is collected at the output 24 of the multivibrator 22 a complementary signal (FIG. 8). The signals 23' and 24' (in FIG. 8) of the outputs 23 and 24 arrive simultaneously at the differential amplifier 25, and a signal which is designated by the reference 26' at the bottom of FIG. 8 is collected at the output 26 of said amplifier.

Only the direct-current component of the signal is retained at the output of the filter 27 and serves to supply the motor 2.

The direct-current component referred-to is a linear function of the width of the pulse which is collected at 26 and therefore depends on the value of a coordinate (in this case $y$) of the eccentric displacement of the orbit. Said component is reduced to zero in the case of a cyclic signal having a width of 1:1 (zero eccentric displacement) and assumes two opposite values in respect of two opposite eccentric positions (along the $y$-axis).

When current is supplied to the motor 2, this latter causes the head B to pivot in such a manner that the sighting line coincides with the missile-target direction, with the result that the circle C2 (FIGS. 3 and 4) returns to the position of the circle C1.

It will be apparent that all of the foregoing explanations given in regard to the eccentric displacement of the orbit along the $y$-axis apply also to the eccentric displacement of the orbit along the $x$-axis by reason of the fact that, in this case, the signals are supplied by the anodes $7l$ and $7n$ which are connected to an electronic assembly $Va$. This assembly controls the motor 5 and is similar to the assembly V which has already been described with reference to FIG. 5.

In the above description, it has been shown that effective means are accordingly made available for the purpose of orienting the sighting line of the head B in the missile-target direction. Brief reference will now be made to the manner in which this orientation is utilized for operating the flight-control mechanisms of the missile for the purpose of guiding this latter towards the target.

As can be seen from FIG. 1, the device comprises the angle detectors 28 and 29 (resolvers, inductive potentiometers, synchros and the like), each of which has the design function on the one hand of detecting at each moment the angle made by the corresponding support (1 and 4) with respect to the reference position and, on the other hand, of transmitting the data which constitute the navigational information to a unit VI in the case of the detector 28 and a unit VIa in the case of the detector 29. Each unit VI and VIa comprises an electronic computer which delivers command signals to the motor means M for the purpose of actuating the flight-controls of the missile.

The novel guidance system presents a large number of advantages, viz:

Low attenuation of the radiation which passes through the lens 8;

The possibility of selecting the speed of displacement of the lens while taking into account only the best conditions of detection by the filiform anodes of the detector 7;

High detecting quality of the anodes by reason of their small area and their thread-like shape;

Protection against the presence of extensive radiation sources;

Absence of angular detection threshold;

Practically linear response;

Very rapid tracking and "capturing" of the target during the pre-aiming position in which the missile is still attached to its carrier, this being achieved by reason of the absence of any gyroscope acting on the orientable head.

What I claim is:

1. In an automatic and autonomous guidance system mounted within a missile which is equipped with flight controls and motor means for actuating said controls, said missile being intended to be guided, by means of said system, towards a target comprising a radiation source, whilst the guidance system comprises a sensitive seeker head which is responsive, along a so called "searching line," to the radiations emanating from said source and to the direction thereof, support means mounted as a universal-joint assembly within the missile for supporting said seeker head which is thus permitted to move with respect to said missile, an electronic control circuit coupled with said seeker head and two driving units connected to and controlled by said electronic circuit, said driving units being operatively connected with the universal-joint support means for controlling the pivotal motion of said support means about the universal-joint axes for the purpose of orienting said searching line in the direction of the target, the fact that the guidance system further comprises detecting and control means responsive to the position of the universal-joint support means with respect to the missile and connected the motor means for the purpose of actuating said motor means as a function of the position of the said universal-joint support means with respect to the missile, in order to restore the parallelism between the searching line and the direction of the missile-target path, whilst the seeker head comprises a lens system having an optical axis parallel to the searching line so as to produce an image of the target, a driving element for causing said target image to describe a circular motion and a radiation detector placed in the image plane of the lens system, responsive to the position of said image and having, disposed in a same plane at right angles to the optical axis of the lens system, four sensitive thin thread-like rectilinear elements spaced at 90° with respect to each other so as to form four arms of a cross and each constituting the anode of an individual photoelectric cell whose cathode is common to the four cells, in such a manner as to supply, to said electronic control circuit, signals whose duration is variable and a function of the coordinates of the center of the circle which is described by the circular moving image with respect to the crossing-point of the sensitive rectilinear elements of the radiation detector.

2. In an automatic and autonomous guidance system mounted within a missile which is equipped with flight controls and motor means for actuating said controls, said missile being intended to be guided, by means of said system, towards a target comprising a radiation source, whilst the guidance system comprises a sensitive seeker head which is responsive, along a so called "searching line," to the radiations emanating from said source and to the direction thereof, support means mounted as a universal-joint assembly within the missile for supporting said seeker head which is thus permitted to move with respect to said missile, an electronic control circuit coupled with said seeker head and two driving units connected to and controlled by said electronic circuit, said driving units being operatively connected with the universal-joint support means for controlling the pivotal motion of said support means about the universal-joint axes for the purpose of orienting said searching line in the direction of the target, the fact that the guidance system further comprises detecting and control means, responsive to the position of the universal-joint support means with respect to the missile and connected to the motor means for the purpose of actuating said motor means as a function of the position of the said universal-joint support means with respect to the missile in order to restore the parallelism between the searching line and the direction missile-target path, whilst the seeker head comprises a lens system having an optical axis parallel to the searching line so as to produce an image of the target, a movable lens support, at least two identical cranks carried by the means for supporting the seeker head and adapted to carry said lens support and a constant-speed motor operatively connected with the cranks for actuating said cranks, causing the lens system to describe a circular movement and thus causing said target image to describe a circular motion, and a radiation detector placed in the image plane of the lens system, responsive to the position of said image and having disposed in a same plane at right angles to the optical axis of the lens system, four sensitive thin thread like rectilinear elements spaced at 90° with respect to each other so as to form four arms of a cross and each constituting the anode of an individual photoelectric cell whose cathode is common to the four cells, in such a manner as to supply, to said electronic control circuit, signals whose duration is variable and a function of the coordinates of the center of the circle which is described by the circular moving image with respect to the cross-point of the sensitive rectilinear elements of the radiation detector.

3. A guidance system as claimed in claim 2, wherein the electronic circuit comprises four identical electronic chains grouped in pairs which are connected respectively to the sensitive rectilinear elements of the radiation detector and adapted to process the useful signals generated by the target radiations and to eliminate the disturbing effect of a spurious signal which may result from any extraneous radiation source and spread over a useful signal, the outputs of the chains of each pair of electronic chains, whose inputs are coupled with two diametrically opposite anodes of the radiation detector, being connected to a power chain which supplies one of said driving units and each electronic chain comprises, in succession in the downstream direction, a threshold device for producing square-wave signals, two monostable multivibrators mounted in parallel and preceded by reversed diodes so as to trip in one case at the leading edge of a signal and in the other case at the trailing edge of said signal and an AND gate which is common to both multivibrators and which transmits a signal only if the duration thereof is shorter than the period of operation of the chain.

4. A guidance system as claimed in claim 3, wherein each power chain whose input is connected to the outputs of the two AND gates of each pair of electronic chains comprises, in succession in the downstream direction, a bistable multivibrator whose two inputs are coupled respectively with the aforesaid AND gates and a differential amplifier whose two inputs are connected to the outputs of the multivibrator and whose single output is coupled with the corresponding driving unit through a filter for eliminating alternating-current components of the amplified signal.

References Cited

UNITED STATES PATENTS

| | | | |
|---|---|---|---|
| 3,128,061 | 4/1964 | Chew | 244—3.16 |
| 3,206,144 | 9/1965 | Welti | 244—3.16 |
| 3,219,294 | 11/1965 | Welti | 244—3.16 |
| 3,351,303 | 11/1967 | Depew et al. | 244—3.16 |

VERLIN R. PENDEGRASS, Primary Examiner